United States Patent [19]

Shimura

[11] Patent Number: 4,855,597
[45] Date of Patent: Aug. 8, 1989

[54] RADIATION IMAGE READ-OUT APPARATUS

[75] Inventor: Kazuo Shimura, Kanagawa, Japan

[73] Assignee: Fuji Photo Film Co., Ltd., Japan

[21] Appl. No.: 895,478

[22] Filed: Aug. 11, 1986

[30] Foreign Application Priority Data

Aug. 15, 1985 [JP] Japan ................. 60-179868

[51] Int. Cl.$^4$ ........................................... G01N 23/04
[52] U.S. Cl. ............................. 250/327.2; 250/354.1
[58] Field of Search ............... 250/327.2, 484.1, 354.1

[56] References Cited

U.S. PATENT DOCUMENTS

2,756,343  7/1956  Johnson ........................... 250/327.2
4,638,162  1/1987  Tanaka et al. .................... 250/327.2

FOREIGN PATENT DOCUMENTS

148410  7/1985  European Pat. Off. ......... 250/484.1

*Primary Examiner*—Carolyn E. Fields
*Attorney, Agent, or Firm*—Gerald J. Ferguson, Jr.

[57] ABSTRACT

A radiation image read-out apparatus comprises a system for scanning a stimulable phosphor sheet carrying a radiation image stored thereon with stimulating rays in a main scanning direction, a system for moving the stimulable phosphor sheet with respect to the stimulating rays in a sub-scanning direction, and a photodetector for detecting light emitted by the stimulable phosphor sheet when it is exposed to stimulating rays. A stored energy signal output device receives information on the level of radiation energy stored on the stimulable phosphor sheet, and generates a signal corresponding to the information. The radiation dose at image recording is used to provide the information on the level of stored energy. A stimulation energy adjuster receives the signal generated by the stored energy signal output device, and adjusts the level of stimulation energy of stimulating rays per unit area of the stimulable phosphor sheet based on the signal.

4 Claims, 3 Drawing Sheets

RADIATION IMAGE READ-OUT APPARATUS

BACKGROUND OF THE INVENTION

1. Field of the Invention

This invention relates to an apparatus for reading out a radiation image stored on a stimulable phosphor sheet. This invention particularly relates to a radiation image read-out apparatus wherein the level of stimulation energy of stimulating rays, which are made to impinge upon the stimulable phosphor sheet, per unit area of the stimulable phosphor sheet is adjustable.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet or simply as a sheet) is first exposed to a radiation passing through an object to have a radiation image of the object stored thereon, and is then scanned with stimulating rays such as a laser beam which cause it to emit light in proportion to the stored radiation energy. The light emitted by the stimulable phosphor sheet upon stimulation thereof is photoelectrically detected and converted to an electric image signal, which is processed to reproduce a visible image having an improved quality, particularly a high diagnostic efficiency and accuracy.

FIG. 3 is a schematic view showing an example of a radiation image read-out apparatus employed in the aforesaid radiation image recording and reproducing system.

In the radiation image read-out apparatus of FIG. 3, a laser beam 1a of a predetermined intensity is emitted as stimulating rays from a laser beam source 1 to a galvanometer mirror 2. The laser beam 1a is deflected by the galvanometer mirror 2 and is made to impinge upon a stimulable phosphor sheet 3 positioned below the galvanometer mirror 2 so that the sheet 3 is scanned by the laser beam 1a in the main scanning direction, i.e. in the width direction of the sheet 3 as indicated by the arrow A. While the laser beam 1a impinges upon the stimulable phosphor sheet 3, the sheet 3 is conveyed in the sub-scanning direction as indicated by the arrow B, for example, by an endless belt device 9. Therefore, scanning in the main scanning direction is repeated at an angle approximately normal to the sub-scanning direction, and the whole surface of the stimulable phosphor sheet 3 is two-dimensionally scanned by the laser beam 1a.

As the stimulable phosphor sheet 3 is scanned by the laser beam 1a, the portion of the sheet 3 exposed to the laser beam 1a emits light having an intensity proportional to the radiation energy stored. The light emitted by the stimulable phosphor sheet 3 enters a transparent light guide member 4 from its light input face 4a positioned close to the sheet 3 in parallel to the main scanning line. The light guide member 4 has a flat-shaped front end portion 4b positioned close to the stimulable phosphor sheet 3 and is shaped gradually into a cylindrical shape towards the rear end side to form an approximately cylindrical rear end portion 4c which is closely contacted with a photomultiplier 5. The light emitted by the stimulable phosphor sheet 3 upon stimulation thereof and entering the light guide member 4 from its light input face 4a is guided inside of the light guide member 4 up to the rear end portion 4c, and received by the photomultiplier 5 via a filter (not shown) for selectively transmitting the light emitted by the stimulable phosphor sheet 3. In the apparatus shown, a light detection means is constituted by the light guide member 4 and the photomultiplier 5. Thus the light emitted by the stimulable phosphor sheet 3 in proportion to the radiation energy stored thereon is detected and converted into an electric image signal by the photomultiplier 5. The electric image signal thus obtained is sent to an image processing circuit 6 and processed therein. The electric image signal thus processed is then reproduced into a visible image and displayed, for example, on a cathode ray tube (CRT) 7, or stored on a magnetic tape 8, or directly recorded as a hard copy on a photographic film or the like.

In the aforesaid radiation image read-out apparatus, when the conditions of the read-out apparatus such as the power and the scanning speed of the stimulating rays are the same, the amount of light emitted by the same stimulable phosphor sheet becomes different in accordance with the radiation dose in the radiation image recording step. Specifically, in the case where the stimulable phosphor sheet is exposed to a large amount of radiation in the radiation image recording step, a high level of radiation energy is stored on the sheet, and therefore the amount of light emitted by the sheet in proportion to the stored radiation energy when it is exposed to stimulating rays becomes large as a whole.

On the other hand, the amount of light emitted by the stimulable phosphor sheet in proportion to the stored radiation energy may be changed by changing the level of stimulation energy of stimulating rays per unit area of the sheet. FIG. 4 is a graph showing the relationship between the amount of light emitted by a stimulable phosphor sheet and the stimulation energy per unit area of the sheet. As shown in FIG. 4, the amount of light emitted by the stimulable phosphor sheet becomes large as the level of stimulation energy of stimulating rays per unit area of the sheet becomes high. Also, the ratio of the extent of change in the amount of light emission to the extent of change in the level of stimulation energy of stimulating rays is approximately the same between a sheet portion where the level of stored radiation energy is high (curve A) and a sheet portion where the level of stored radiation energy is low (curve B). Therefore, the contrast of a reproduced visible image is not so much affected even though the level of stimulation energy of stimulating rays to which the stimulable phosphor sheet carrying a radiation image stored thereon is exposed is changed to make the amount of light emitted by the sheet change as a whole. Accordingly, even if image read-out is conducted using a decreased level of stimulation energy per unit area of the sheet, it is still possible to read out the radiation image accurately. In order to decrease the level of stimulation energy of stimulating rays per unit area of the sheet, the scanning speed of the stimulating rays with respect to the sheet may be increased, or the amount of the stimulating rays may be decreased. In the former case, it becomes possible to shorten the time required for image read-out, thereby to increase the read-out efficiency per unit time. In the latter case, it is possible to decrease the running cost of the apparatus by decreasing the power of the stimulating ray source.

On the other hand, in the case where the level of radiation energy stored as image information on a stimulable phosphor sheet is comparatively low and the amount of light emitted by the sheet is small, it is not advantageous from the viewpoint of noise to decrease the level of stimulation energy of stimulating rays and to make the amount of light emitted by the sheet smaller. FIG. 5 is a graph showing the relationship between the amount of light emitted by a stimulable phosphor sheet and the level of noise. As shown in FIG. 5, the level of noise is high at a region where the amount of light emitted by the stimulable phosphor sheet is small, and gradually decreases as the amount of light emission increases. Also, the extent of decrease in noise becomes gradually small as the amount of light emission increases, and is almost saturated at a region where the amount of light emission is large. Therefore, when stimulation energy of stimulating rays is decreased at a sheet portion where the level of stored radiation energy is high so that the light emission amount I1A decreases to the light emission amount I1B, the level of noise changes from $\delta^2 1A$ to $\delta^2 1B$ and thus noise does not so much increase. However, when stimulation energy of stimulating rays is decreased as a sheet portion where the level of stored radiation energy is low so that the light emission amount I2A decreases to the light emission amount I2B, noise increases markedly from $\delta^2 2A$ to $\delta^2 2B$. Accordingly, in the case where the level of stimulation energy of stimulating rays per unit area of a stimulable phosphor sheet is changed, it is necessary to approximately ascertain the level of radiation energy stored on the stimulable phosphor sheet, and to adjust the level of stimulation energy of stimulating rays per unit area of the sheet based on the ascertained level of stored radiation energy.

SUMMARY OF THE INVENTION

The primary object of the present invention is to provide a radiation image read-out apparatus wherein the level of stimulation energy of stimulating rays per unit area of a stimulable phosphor sheet is adjustable in accordance with the level of radiation energy stored on the stimulable phosphor sheet.

Another object of the present invention is to provide a radiation image read-out apparatus wherein radiation image read-out is conducted efficiently and with low cost by decreasing stimulation energy of stimulating rays per unit area of a stimulable phosphor sheet when the level of radiation energy stored on the stimulable phosphor sheet is high.

The present invention provides a radiation image read-out apparatus including a main scanning means for scanning a stimulable phosphor sheet carrying a radiation image of an object stored thereon with stimulating rays in a main scanning direction to cause the stimulable phosphor sheet to emit light in proportion to the stored radiation energy, a sub-scanning means for moving the stimulable phosphor sheet with respect to the stimulating rays in a sub-scanning direction approximately normal to the main scanning direction, and a light detection means for detecting the light emitted by the stimulable phosphor sheet in proportion to the stored radiation energy, wherein the improvement comprises the provision of:

(i) a stored energy signal output means for receiving input of information of the level of radiation energy stored on said stimulable phosphor sheet and generating a signal corresponding to said information, and (ii) a stimulation energy adjusting means for receiving said signal generated by said stored energy signal output means and adjusting the level of stimulation energy of said stimulating rays per unit area of said stimulable phosphor sheet on the basis of said signal.

With the radiation image read-out apparatus of the present invention, since the level of stimulation energy of stimulating rays per unit area of the stimulable phosphor sheet is adjusted in accordance with the level of radiation energy stored on the stimulable phosphor sheet, it is possible to increase the scanning speed or to decrease the amount of stimulating rays when the level of radiation energy stored on the stimulable phosphor sheet is high. Accordingly, it becomes possible to conduct radiation image read-out efficiently, to increase the processing quantity per unit time, and to decrease the running cost of the apparatus.

In the radiation image read-out apparatus of the present invention, when information on the level of radiation energy stored on each stimulable phosphor sheet is entered to the stored energy signal output means, a signal is generated in accordance with the entered information by the stored energy signal output means. Based on the generated signal, the stimulation energy adjusting means adjusts the level of stimulation energy of stimulating rays per unit area of the stimulable phosphor sheet. The adjustment of the level of stimulation energy may be carried out by adjusting the amount of stimulating rays emitted by a stimulating ray source or the scanning speed of stimulating rays with respect to the stimulable phosphor sheet. Therefore, the stimulation energy adjusting means may be a means for adjusting the amount of stimulating rays emitted by the stimulating ray source, or a means for adjusting the scanning speed. The information on the level of radiation energy stored on the stimulable phosphor sheet, which is entered to the stored energy signal output means, may be calculated from the radiation dose to the stimulable phosphor sheet in the radiation image recording step, or may be accurately investigated by detecting the level of stored radiation energy for each stimulable phosphor sheet.

In this specification, the phrase "moving a stimulable phosphor sheet with respect to stimulating rays in a sub-scanning direction" means movement of the stimulable phosphor sheet relative to the stimulating rays in the sub-scanning direction and includes both the movement of the stimulable phosphor sheet with the stimulating rays standing still in the sub-scanning direction and the movement of the stimulating rays in the sub-scanning direction with the stimulable phosphor sheet standing still.

DESCRIPTION OF THE PREFERRED EMBODIMENTS

The present invention will hereinbelow be described in further detail with reference to the accompanying drawings.

Figure 1:
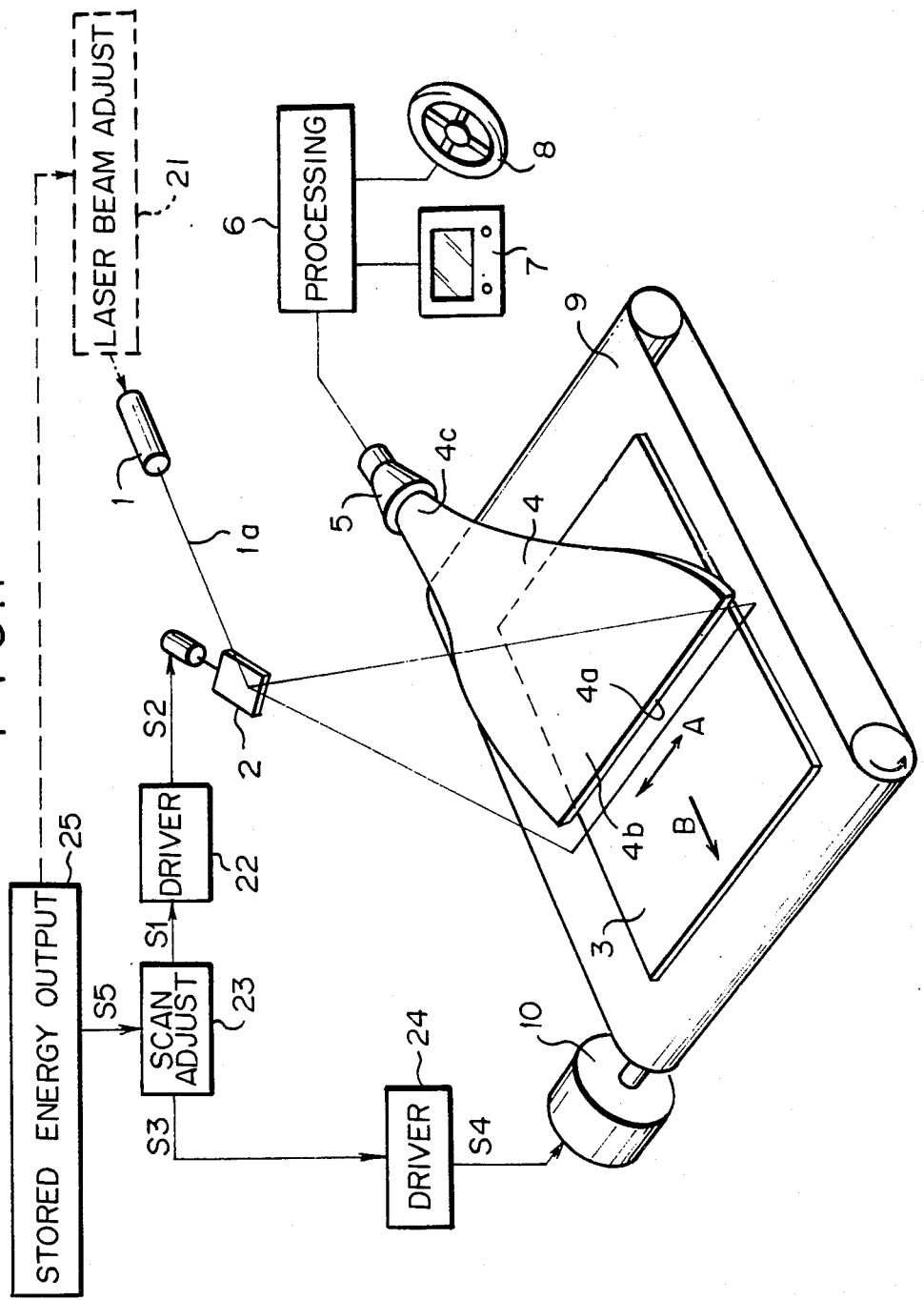
FIG. 1 is a schematic view showing an embodiment of the radiation image read-out apparatus in accordance with the present invention.
Figure 3:
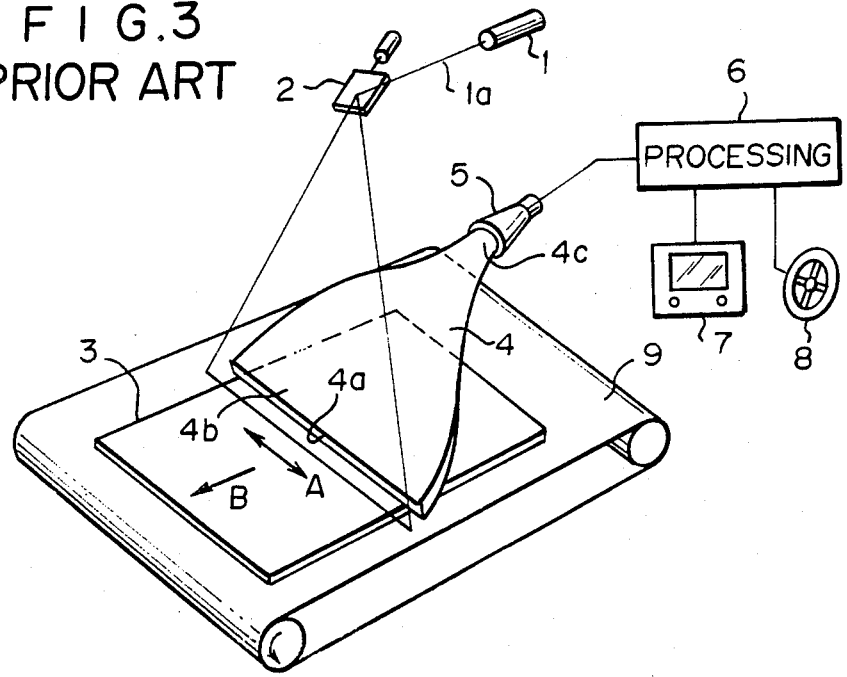
FIG. 3 is a schematic view showing the conventional radiation image read-out apparatus.
Figure 4:
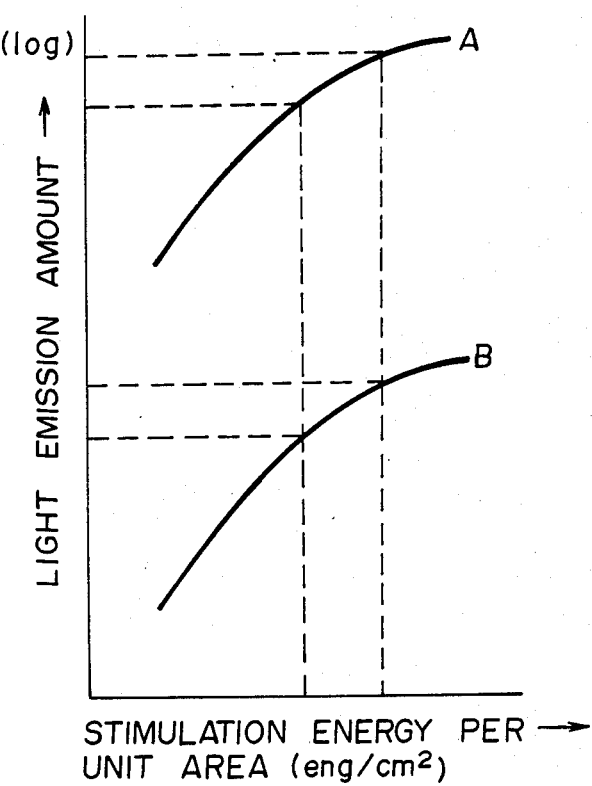
FIG. 4 is a graph showing the relationship between the amount of light emitted by a stimulable phosphor sheet and the stimulation energy per unit area of the sheet.
Figure 5:
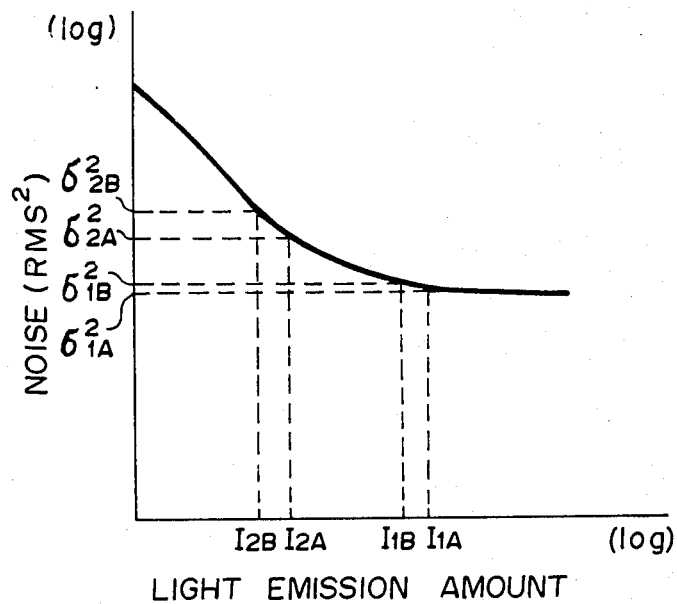
FIG. 5 is a graph showing the relationship between the amount of light emitted by a stimulable phosphor sheet and the level of noise.

In FIG. 1 showing an embodiment of the radiation image read-out apparatus in accordance with the present invention, similar elements are numbered with the same reference numerals with respect to FIG. 3.

The laser beam 1a emitted as stimulating rays by the laser beam source 1 impinges upon the galvanometer mirror 2. The laser beam 1a is deflected by the galvanometer mirror 2 and made to impinge upon and scan the stimulable phosphor sheet 3 in the main scanning direction as indicated by the arrow A. At the same time, the stimulable phosphor sheet 3 is conveyed by the endless belt device 9, which is driven by a motor 10, in the sub-scanning direction as indicated by the arrow B.

The scanning speed of the laser beam 1a changes in accordance with the swinging period of the galvanometer mirror 2 and the rotation speed of the motor 10. Therefore, the apparatus of this embodiment is provided with a scanning speed adjusting means 23 for sending a period control signal S1 and a speed control signal S3 respectively to a driver 22 for the galvanometer mirror 2 and a driver 24 for the motor 10. In the case where the level of radiation energy stored on the stimulable phosphor sheet 3 subjected to image read-out is high, the image read-out is achieved accurately even though the level of stimulation energy of the laser beam 1a per unit area of the sheet 3 is decreased. Therefore, in this case, the period control signal S1 for shortening the swinging period of the galvanometer mirror 2 and/or the speed control signal S3 for increasing the rotation speed of the motor 10 is generated by the scanning speed adjusting means 23. Based on the control signals S1 and S3, the drivers 22 and 24 respectively send drive signals S2 and S4 to the galvanometer mirror 2 and the motor 10. In this manner, the swinging period of the galvanometer mirror 2 is shortened, and/or the rotation speed of the motor 10 is increased, thereby to increase the scanning speed of the laser beam 1a with respect to the stimulable phosphor sheet 3.

The control of the scanning speed by the adjustment of the swinging period of the galvanometer mirror 2 and the rotation speed of the motor 10 should be conducted in accordance with the level of radiation energy stored on the stimulable phosphor sheet 3. Therefore, the apparatus of this embodiment is provided with a stored energy signal output means 25 for receiving information on the level of radiation energy stored on the stimulable phosphor sheet and sending a signal S5 corresponding to said information to the scanning speed control means 23. Entering of the information on the level of radiation energy stored on the stimulable phosphor sheet to the stored energy signal output means 25 will hereinbelow be described with reference to FIG. 2.

Figure 2:
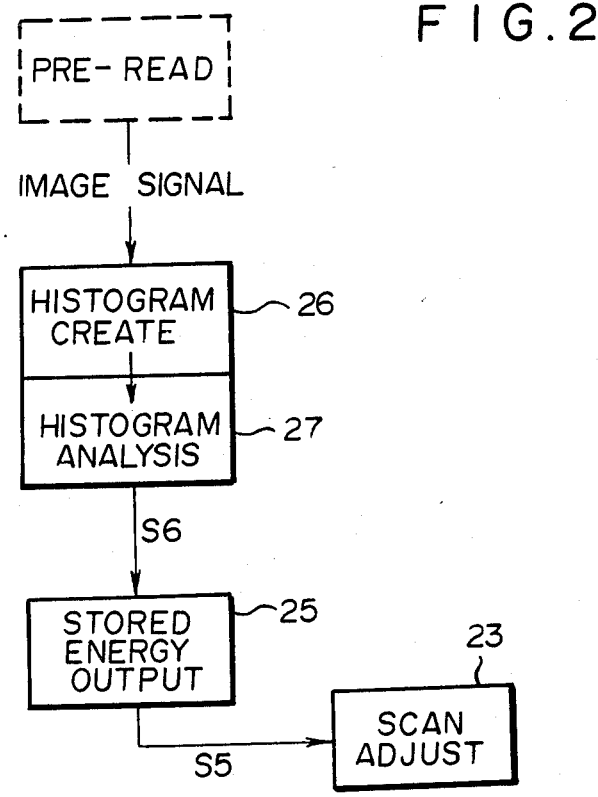
FIG. 2 is a block diagram showing the sequence of entering information to the stored energy signal output means in the embodiment of FIG. 1.

In the aforesaid radiation image recording and reproducing system, prior to final read-out conducted as described above, preliminary read-out may be conducted for approximately ascertaining the radiation image stored on the stimulable phosphor sheet by use of stimulating rays having stimulation energy of a level lower than the stimulation energy of the stimulating rays used in final read-out, and read-out conditions in the final read-out and/or image processing conditions may be adjusted on the basis of the image information obtained by the preliminary read-out. FIG. 2 shows the case where the scanning speed is controlled based on the information obtained by preliminary read-out. Specifically, in order to adjust the read-out gain or the like in the final read-out, the image signal obtained by the preliminary read-out is sent to a histogram creating section 26 for creating a histogram of levels of image signals at respective picture elements. The histogram created by the histogram creating section 26 is sent to a histogram analysis section 27 and is analyzed thereby. The level of radiation energy stored on the stimulable phosphor sheet may be ascertained by analyzing the histogram. Therefore, a signal S6 corresponding to the level of radiation energy ascertained for each stimulable phosphor sheet is sent from the histogram analysis section 27 to the stored energy signal output means 25, and the stored energy signal output means 25 generates the signal S5 based on the entered information on the level of stored radiation energy and sends the signal S5 to the scanning speed control means 23. In the case where the scanning speed of stimulating rays is changed based on the information obtained by the preliminary read-out and image read-out is conducted on a stimulable phosphor sheet carrying a high level of radiation energy stored thereon, it is possible to shorten the image read-out time and to conduct the image read-out efficiently by shortening the swinging period of the galvanometer mirror and/or increasing the rotation speed of the motor, thereby increasing the scanning speed. The adjustment of the scanning speed may be carried out continuously or stepwise.

Besides the use of the preliminary read-out, entering of the information on the radiation energy stored on the stimulable phosphor sheet to the stored energy signal output means 25 may be carried out as described below. As described above, the level of radiation energy stored on the stimulable phosphor sheet may be approximately presumed in accordance with the radiation dose in the radiation image recording step. Therefore, information on the radiation dose to the stimulable phosphor sheet may be entered to the stored energy signal output means 25, and the scanning speed may be adjusted based on the entered information. For example, since the radiation dose is approximately fixed by the image recording conditions such as the image recording portion of an object and the image recording method, the information on the image recording conditions may be manually entered to the stored energy signal output means 25, and a control signal stored in advance may be generated in accordance with the entered information. Or, a signal corresponding to a setting value of the radiation dose may be automatically sent from a photo timer or the like for setting the radiation dose to a predetermined value to the stored energy signal output means 25.

Instead of using the galvanometer mirror 2, a multi-face rotating mirror may be used as the light deflector. Also, instead of changing the operation speed of a single light deflector as in the aforesaid embodiment, a plurality of light deflectors of different operation speeds may be provided, and the change in the operation speed may be effected by switching among the light deflectors. In this case, the switchover of the light deflectors may be carried out by the signal generated by the scanning speed adjusting means 23.

Besides the change of the scanning speed of the stimulating rays with respect to the stimulable phosphor sheet, the level of stimulation energy of stimulating rays per unit area of the sheet may also be changed by adjusting the amount of the stimulating rays emitted by the stimulating ray source. Specifically, as indicated by the broken line in FIG. 1, a laser beam amount adjusting means 21 may be connected with the laser beam source 1, and the signal S5 may be sent from the stored energy signal output means 25 to the laser beam amount adjusting means 21 to change the laser beam amount in accordance with the level of radiation energy stored on the stimulable phosphor sheet 3 so that the laser beam amount is decreased when the level of radiation energy stored on the sheet 3 is high. When the laser beam amount is changed in accordance with the stimulable phosphor sheet subjected to the image read-out, since the output of the laser beam 1a may be decreased for a stimulable phosphor sheet on which the level of stored radiation energy is high and image read-out is possible with a small laser beam amount, it is possible to decrease the running cost of the apparatus.

Further, instead of using a single laser beam source 1, a plurality of laser beam sources having different laser beam outputs may be provided and the laser beam output changed by switching among the laser beam sources. In this case, a laser beam source switching means may be provided as the laser beam amount adjusting means 21.

The effect of adjusting the stimulation energy of stimulating rays per unit area of the stimulable phosphor sheet in accordance with the level of radiation energy stored on the stimulable phosphor sheet is accomplished insofar as at least one of the scanning speed adjusting means 23 and the laser beam amount adjusting means 21 is provided. However, both the scanning speed adjusting means 23 and the laser beam amount adjusting means 21 should preferably be provided to widen the range of adjustment of stimulation energy of stimulating rays. In the aforesaid embodiment, the scanning speed adjusting means 23 acts to control the swinging period of the galvanometer mirror 2 and to control the rotation speed of the motor 10. (That is, the scanning speed adjusting means 23 acts as the main scanning speed adjusting means and the sub-scanning speed adjusting means.) However, a means for adjusting the swinging period of the galvanometer mirror 2 and a means for adjusting the rotation speed of the motor 10 may be provided independently.

I claim:

1. A radiation image read-out apparatus including a main scanning means for scanning a stimulable phosphor sheet carrying a radiation image of an object stored thereon with stimulating rays in a main scanning direction to cause the stimuable phosphor sheet to emit light in proportion to the stored radiation energy, a sub-scanning means for moving the stimuable phosphor sheet with respect to the stimulating rays in a sub-scanning direction approximately normal to the main scanning direction, and a light detection means for detecting the light emitted by the stimulable phosphor sheet in proportion to the stored radiation energy, wherein the improvement comprises the provision of:
(i) a stored energy signal output means for receiving input of information on the level of radiation energy stored on said stimulable phosphor sheet and generating a signal corresponding to said information,
(ii) a stimulation energy adjusting means for receiving said signal generated by said stored energy signal said stimulating rays per unit area of said stimulable phosphor sheet on the basis of said signal;
(iii) a means for inputting information on the radiation dose on the stimulable phosphor sheet at image recording to the stored energy output means; and
(iv) means for calculating the level of stimulation energy of stimulating rays per unit area of the stimulable phosphor sheet based on the input information from said means for inputting information.

2. An apparatus as defined in claim 1 wherein said stimulation energy adjusting means is a scanning speed adjusting means for adjusting the scanning speed of said stimulating rays with respect to said stimulable phosphor sheet.

3. An apparatus as defined in claim 1 wherein said stimulation energy adjusting means is a stimulating ray amount adjusting means for adjusting the amount of said stimulating rays.

4. An apparatus as defined in claim 1 wherein said stimulation energy adjusting means is constituted by a scanning speed adjusting means for adjusting the scanning speed of said stimulating rays with respect to said stimulable phosphor sheet, and a stimulating ray amount adjusting means for adjusting the amount of said stimulating rays.

* * * * *